H. L. DOOLEY.
CLUTCH MECHANISM FOR PLANTERS.
APPLICATION FILED MAR. 24, 1910.
1,135,442.
Patented Apr. 13, 1915.
3 SHEETS—SHEET 1.
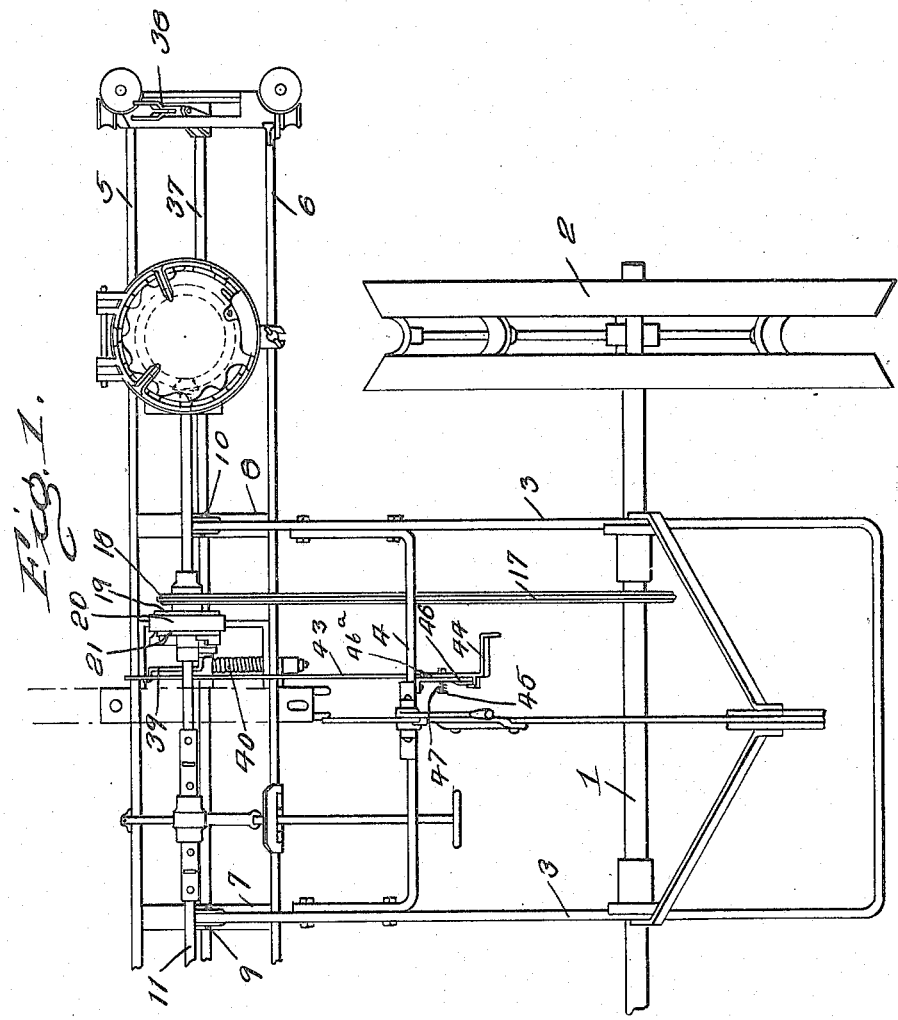
Witnesses
Inventor
H. L. Dooley
By H. H. Bliss
Attorney

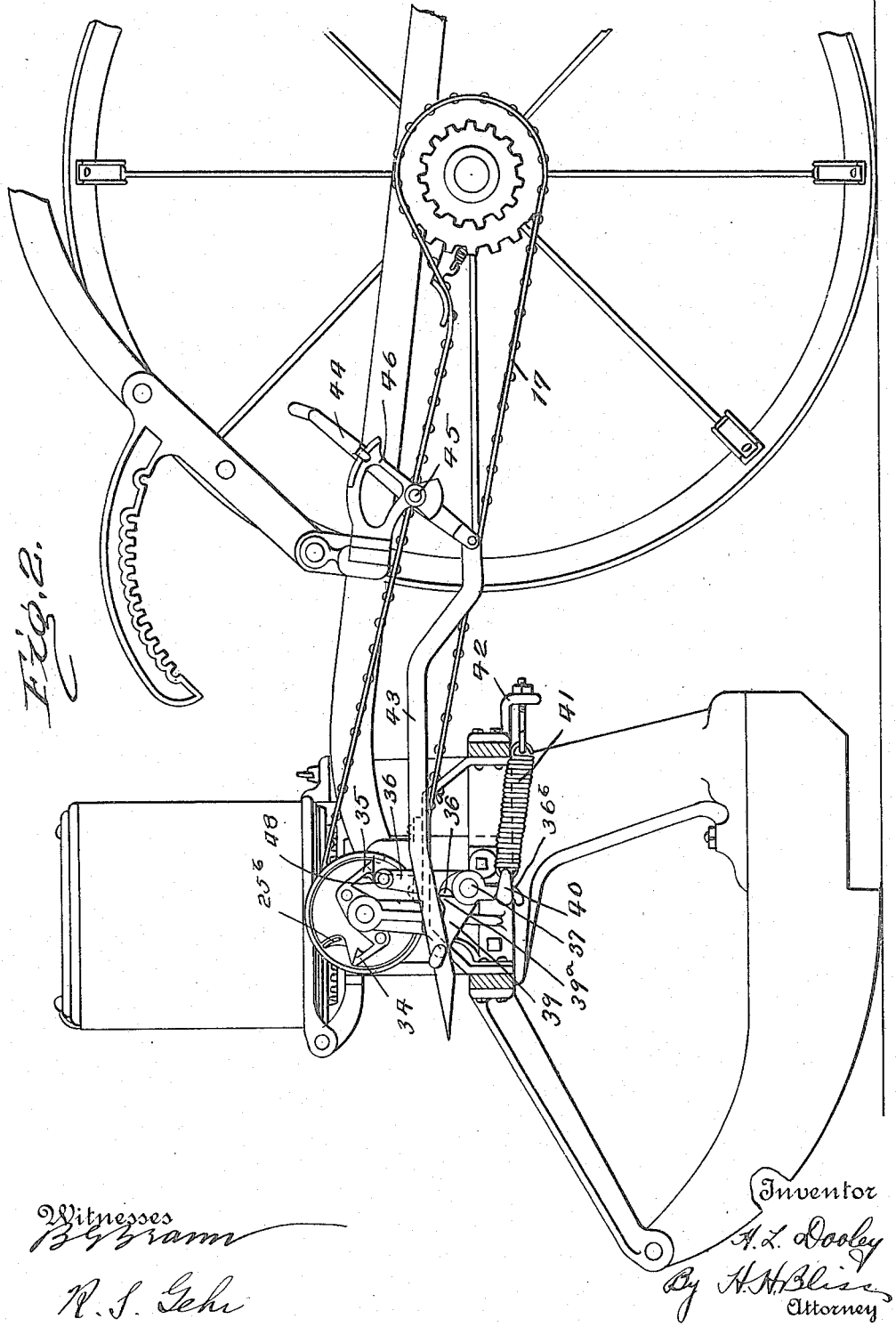

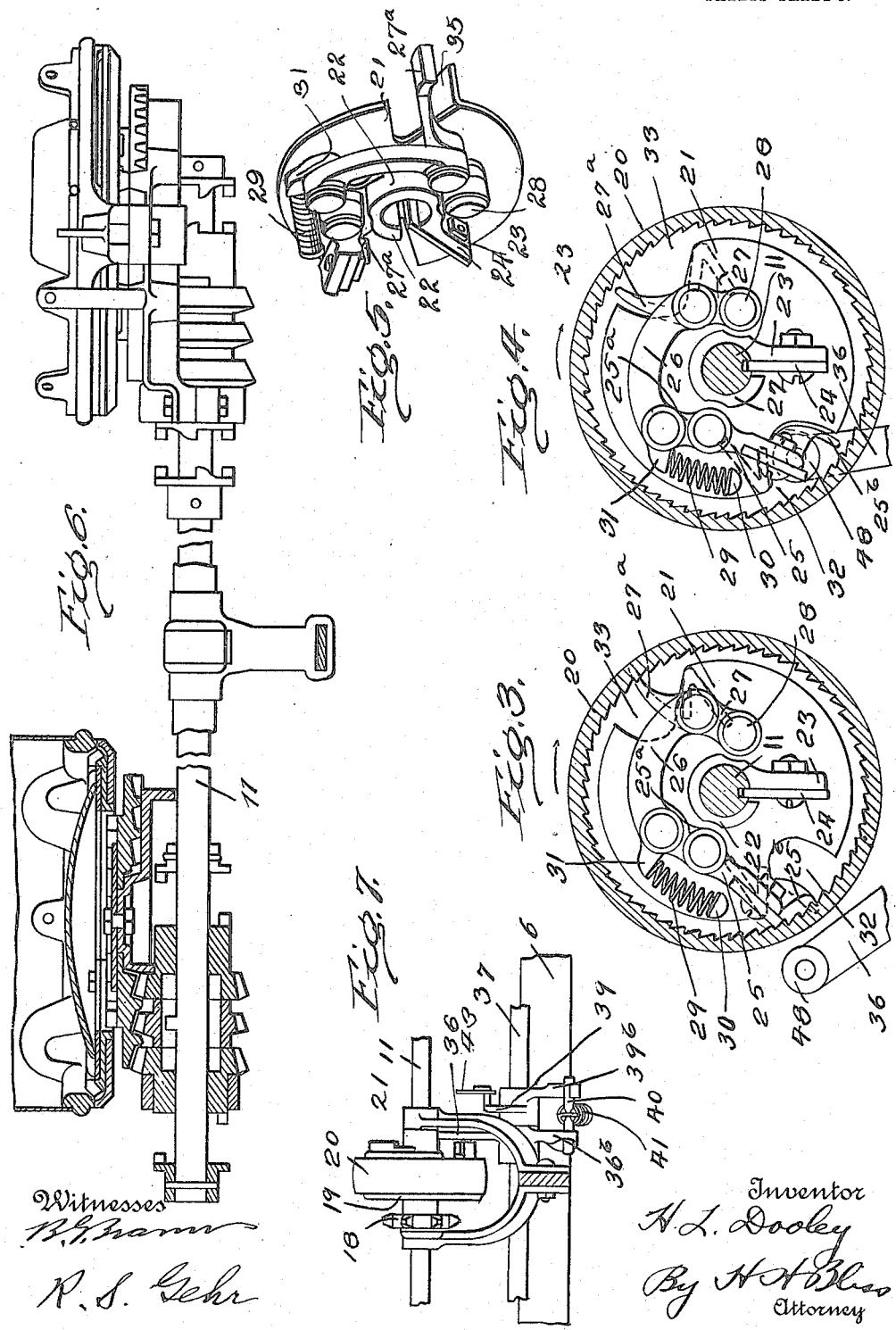

UNITED STATES PATENT OFFICE.

HARRY L. DOOLEY, OF ROCK ISLAND, ILLINOIS.

CLUTCH MECHANISM FOR PLANTERS.

1,135,442. Specification of Letters Patent. Patented Apr. 13, 1915.

Application filed March 24, 1910. Serial No. 551,233.

*To all whom it may concern:*

Be it known that I, HARRY L. DOOLEY, a citizen of the United States, residing at Rock Island, in the county of Rock Island and State of Illinois, have invented certain new and useful Improvements in Clutch Mechanism for Planters, of which the following is a specification, reference being had therein to the accompanying drawings.

This invention relates to improvements in the clutch mechanisms which are used in corn planters of the sort where power is taken continuously from the ground wheels to some intermediate part and is intermittently transmitted to the seeding mechanism through a predetermined cycle.

It is essential in a clutch mechanism for planters that means be provided for throwing the driving dog completely out of engagement with the teeth of the driver. In many clutches which have been proposed no such means has been provided and the result has been that the pawl has been disengaged only sufficiently to interrupt transmission of power but not sufficiently to prevent the clicking of the pawl against the corners of the teeth on the driver. The device which is usually provided for completely disengaging the pawl is a cam positioned to engage the trip device and hold it temporarily out of engagement with the pawl so that when engagement is permitted the pawl will have reached the position such that the trip device will move it entirely out of contact with the driver teeth.

One of the objects of this invention is to provide a clutch of this "completely disengaging" type which is automatically disengaged after rotating through less than a complete revolution, in this case the angle of rotation being 180°.

Other objects of the invention are to provide certain improved structural features which will be apparent from the specification and the drawings.

Referring to the drawings which illustrate the embodiment of my invention which I prefer, Figure 1 is a plan view of a part of a planting machine sufficient to indicate the manner of applying my improvements. Fig. 2 is a longitudinal section showing the relative positions of the clutch and its adjuncts and driving mechanism. Fig. 3 is a vertical section showing the clutch mechanism with the parts in the positions occupied when power is being transmitted therefrom to the seeding mechanism. Fig. 4 is a similar view, except that the parts of the two clutch elements are shown after disengagement. Fig. 5 shows part of the clutch detached. Fig. 6 is a view, partly in section and partly in elevation showing some of the parts of the seeding mechanism, and of the shaft and intermediate driving element. Fig. 7 is a detail view showing the clutch and associated parts in front elevation.

In the drawings there are shown some of the parts of a planter, but it will be understood that the devices to which the present invention more particularly relates are not dependent upon the special details which are here selected for illustration.

1 indicates the axle, and 2 the ground wheels of the rear frame, 3, 3 are the side bars and 4 a transverse bar of this rear frame, it being pivotally connected at 9 and 10 to the front frame or runner frame, having the bars, 5 and 6 and suitably connected with bars at 7 and 8. 11 is the seeder shaft mounted in this front frame, and extending from one of the seeding mechanisms to the other. The details of these frames, the seeding mechanism and other parts are fully illustrated and described in other applications for patent, which I have filed, and to which reference can be made. Here it is sufficient to note that the seeder shaft 11 is capable of having imparted to it, at intervals, movement cycles of predetermined amount, and each of these predetermined movements can be translated into more or less movement of the seeder plates according to election and adjustment.

The present improvements are incident to the devices by which the starting and stopping of the seeder shaft are affected in such a way as to secure the predetermined cycles referred to.

17 is a sprocket chain engaging with a driving sprocket wheel on the axle, and extending to a continuously rotating wheel 18, on the seeder shaft. Rigidly connected to this sprocket wheel is one, 19, of the two main elements of a clutch mechanism. This element having a drum like part 20, with an internally toothed rim.

21 is a disk fitting the open side of drum 20 and formed with a sleeve 22 having flange 23, which carries key 24, loosely fitting a slot in shaft 11. The shaft and disk turn together, but the shaft can slide endwise. Disk 21 has a pivoted pawl or dog 25 to engage the toothed drum 20 and formed with extension 25ª, connected by link 26 with arm 27 pivoted at 28 to disk 21. Spring 29 between lug 30 on disk 21 and lug 31 on extension 25ª tend to hold the dog 25 in engagement with the teeth of the drum.

32 and 33 are notches in disk 21. Pawl 25 carries a flange 25ᵇ extending through notch 32 and 27ª is a flange on link 27 extending through notch 33.

34 and 35 are cam flanges on disk 21 near notches 32 and 33. Flanges 25ᵇ and 27ª extend outward beyond flanges 34 and 35.

36 is an arm on the rock shaft 37 and 38 is one of the tappet forks thereof. The arm 36 turns freely on shaft 37, but near it is a second arm 39 fast to the shaft. Arm 39 carries a lug 39ª to engage lug 36ª on arm 36, and the latter is formed with extension 36ᵇ while arm 39 has an extension 39ᵇ. These are connected by a link 40 engaging them loosely and to which is secured spring 41, adjustably attached to bracket 42. Arm 39 is connected by link 43 to foot lever 44 on the frame, which lever is held by pivot 45 on bracket 46. The latter has a locking tooth 46ª, and as lever 44 is swung forward it can be forced over this tooth, spring 47 being interposed between the end of the bracket and the pivot 45 so that a certain amount of lateral movement is allowed the foot lever 44.

When a tappet swings the check fork 38 and shaft 37 backward the rigid arm 39 will carry arm 36 backward, moving against the tension of spring 41. Arm 36 has a roller 48 to engage flanges 25ᵇ and 27ª and cams 34 and 35 of the clutch mechanism. In Fig. 4 arm 36 is in its normal position with roller 48 engaging flange 25ᵇ and pressing it forward to hold pawl 25 away from the teeth. When the check fork is swung backward by a tappet, arm 36 moves to the position in Fig. 3 and spring 29 throws pawl 25 into the teeth whereupon disk 21 and shaft 11 are driven by drum 20. After this movement of the shaft commences the check fork is released from the tappet and the fork and rock shaft and arm 36 are again thrown forward by spring 41. As the rotation of the clutch continues the flange 35 engages roller 48 and throws arm 36 backward far enough to clear the cam, whereupon the roller snaps forward under the action of the spring 41 against flange 27ª so that arm 27, link 26 and pawl 25 are moved to disengage the pawl from the teeth of drum 20.

It will be clear that the cams 34 and 35 engage the roller 48 to prevent its engaging the pawls as soon as it otherwise would. In this way the disk and shaft are permitted to rotate sufficiently to carry the arms 25ᵇ and 27ª to such points that when they are engaged by the roller 48, they are moved sufficiently to completely disengage the pawl 25 from the teeth of the drum. It is clear that if the cams were not provided, the arms would be moved only sufficiently to prevent the transmission of power, the pawl being left in position to graze or click against the corners of the teeth.

In other words, for disengaging the pawl, dependence is not placed upon the rotative movement of the driven clutch member with respect to the arm 36; but, instead, dependence is placed upon the relative movement of the arm 36 radially inward under the influence of its spring. The spring, when released, moves the arm sufficiently to completely disengage the pawl.

The backward movement of arm 36 caused by cam 35 is independent of arm 39 and rock shaft 37. The valves which are actuated by shaft 37 are not moved by the backward movement of arm 36. On the second actuation of the check fork the clutch is thrown into engagement in the same manner as before and after a half revolution of the parts the cam 34 engages roller 48, forcing it backward as before, until it is released and snapped forward against 25ᵇ, thus withdrawing pawl 25 from engagement with the clutch teeth. And so the operation continues, the seeder shaft being given half a revolution with each actuation of the check fork. In order to obviate the motion of the foot lever 44 with the rock shaft 37 and the lever 39, I have constructed the lever so that it can be disconnected from the arm 39, if desired.

What I claim is—

1. In a clutch mechanism for planters, the combination of a shaft adapted to be driven, a continuously driven drum rotatably mounted on said shaft, said drum having internal radially extending teeth and being open on one side, a disk keyed on the shaft and disposed so as to close the open side of the drum, a spring pressed pawl pivoted on the inner side of the said disk, a spring tending normally to press the pawl into operative engagement with the teeth of the drum, a flange on the pawl extending through an opening of the disk, a movable spring pressed device disposed normally in the path of the pawl flange and adapted to hold the pawl out of engagement with the drum teeth, and a cam on the outer side of the disk adjacent the pawl flange adapted when the disk is turned to engage and retract the said movable device.

2. In a clutch mechanism for planters, the combination of a shaft adapted to be driven, a continuously driven drum rotatably mounted on said shaft, said drum having internal radially extending teeth and being open on one side, a disk keyed on the shaft and disposed so as to close the open side of the drum, a spring pressed pawl pivoted on the inner side of the said disk, a spring tending normally to press the pawl into operative engagement with the teeth of the drum, a flange on the pawl extending through an opening of the disk, a second flange connected to said pawl and extending through an opening of the disk, a movable spring pressed device disposed normally in the path of the pawl flanges and adapted when in engagement with one or the other of said flanges to hold the pawl out of engagement with the drum teeth, and cams on the outer side of the disk, one adjacent each of the pawl flanges, adapted when the disk is turned to engage and retract the said movable device.

3. In a clutch mechanism for planters, the combination of a shaft adapted to be driven, a continuously driven drum rotatably mounted on said shaft, said drum having internal radially extending teeth and being open on one side, a disk keyed on the shaft and disposed so as to close the open side of the drum, a spring pressed pawl pivoted on the inner side of the said disk, a spring tending normally to press the pawl into operative engagement with the teeth of the drum, a flange on the pawl extending through an opening of the disk, a lever pivoted on the inner side of the disk, a link connecting the lever and the pawl, a flange on said lever extending through an opening of the disk, a movable spring pressed device disposed normally in the path of said pawl and lever flanges and adapted when in engagement with one or the other of said flanges to hold the pawl out of engagement with the drum teeth, and cams on the outer side of the disk, one adjacent each of the said flanges, adapted when the disk is turned to engage and retract the said movable device.

4. In a clutch mechanism for planters, the combination of a longitudinally movable rotatable shaft, a continuously rotating element mounted on the shaft and adapted to permit relative longitudinal and rotative movement of the shaft, a pawl carrier on the shaft, a pawl on the carrier adapted to operatively engage the said rotating part, and means for connecting the said carrier to the shaft comprising a lateral radially extending flange on the carrier and a key plate secured to said flange with its inner edge engaging a slot in the shaft.

5. In a clutch mechanism for planters, the combination of a shaft adapted to be driven, a continuously rotating driver on the said shaft, a carrier element on the shaft, an automatically acting spring pressed pawl mounted on the carrier in position to engage the driver, a plurality of arms equally spaced circumferentially, each arm being pivoted to the carrier separately from any other arm and connected with the pawl, a movable trip device mounted to normally engage one or another of the arms to hold the pawl out of engagement with the driver, means for moving the trip device to momentarily disengage it from the arm, and a plurality of cams on the carrier respectively in advance of the arms, each cam as it moves serving to engage the trip device and momentarily hold it out of engagement with the corresponding arm.

6. In a planter clutch mechanism, the combination of a shaft adapted to be driven, a continuously driven open-sided drum rotatably mounted on the said shaft and provided with internal teeth, a disk secured to the shaft and disposed in position to close the open side of the drum, two arms pivoted to the disk at diametrically opposite points, a connection between the two arms whereby both of them move simultaneously and in the same direction about their pivots, a spring-pressed pawl connected with one of the arms and adapted to normally engage the teeth of the drum, a device normally in position to engage one of the said arms to hold the pawl out of engagement with the drum teeth, means for moving the trip device to momentarily disengage it from the arm, and two cams on the carrier respectively in advance of the arms, each cam as it moves serving to engage the trip device and momentarily hold it out of engagement with the corresponding arm.

7. In a planter clutch mechanism, the combination of a shaft adapted to be driven, a continuously driven drum rotatable on the shaft and provided with teeth, a disk secured to the shaft adjacent the drum, a spring-pressed pawl mounted on the disk and adapted to normally engage the drum teeth, a plurality of arms pivotally connected with the disk, the pivots being equi-distantly disposed at the same radial distance from the disk center, connections between all of the arms and the pawl whereby each of the arms moves simultaneously with each other arm and with the pawl, a trip device normally in position to engage one or another of the arms to hold the pawl out of engagement with the drum teeth, means for moving the trip device to disengage it from one of the arms, an automatically acting spring for returning the trip device to its normal position to engage the next arm as the disk is rotated, and automatically acting means dependent upon the rotation of the disk for momentarily retracting the said trip device immediately prior to its engagement with an arm, the said trip device upon being released moving under the influence of its spring to engage the arm and force the pawl entirely out of engagement with the drum teeth.

8. In a planter clutch mechanism, the combination of a shaft adapted to be driven, a clutch on the shaft comprising a continuously rotating element, an element keyed on the shaft, a pawl tending to normally operably connect the two clutch elements, a cam on the element connected with the shaft, a pawl controlling device adjacent the cam, a rock shaft adjacent the said clutch, two arms on the rock shaft, one rigidly attached and the other angularly movable, stops whereby the motion of the movable arm is limited by the attached arm, the movable arm being adapted to be engaged by the cam of the clutch mechanism and thereby swung outward, a connecting link between the two arms, and a spring secured to the said link and tending to turn the rock shaft by the attached arm and to swing the movable arm after its disengagement from the cam into engagement with the pawl controlling device to move the pawl into position to disengage the two clutch elements.

In testimony whereof I affix my signature, in presence of two witnesses.

HARRY L. DOOLEY.

Witnesses:
GALE PORTER,
RALPH B. LOURIE.

Copies of this patent may be obtained for five cents each, by addressing the "Commissioner of Patents, Washington, D. C."